United States Patent
Elomaa

(10) Patent No.: US 10,131,519 B2
(45) Date of Patent: Nov. 20, 2018

(54) MECHANISM FOR PASSENGER FLOW MANAGEMENT

(71) Applicant: Niko Elomaa, Hyvinkaa (FI)

(72) Inventor: Niko Elomaa, Hyvinkaa (FI)

(73) Assignee: Kone Corporation, Helsinki (FI)

(*) Notice: Subject to any disclaimer, the term of this patent is extended or adjusted under 35 U.S.C. 154(b) by 435 days.

(21) Appl. No.: 14/870,491

(22) Filed: Sep. 30, 2015

(65) Prior Publication Data
US 2016/0016756 A1 Jan. 21, 2016

Related U.S. Application Data

(63) Continuation of application No. PCT/FI2013/050475, filed on Apr. 26, 2013.

(51) Int. Cl.
| | |
|---|---|
| G05B 15/02 | (2006.01) |
| B66B 1/34 | (2006.01) |
| H04B 17/00 | (2015.01) |
| H04W 4/02 | (2018.01) |

(52) U.S. Cl.
CPC .......... *B66B 1/3476* (2013.01); *B66B 1/3446* (2013.01); *G05B 15/02* (2013.01); *H04B 17/00* (2013.01); *H04W 4/02* (2013.01)

(58) Field of Classification Search
CPC ..... B66B 1/3476; B66B 1/3446; G05B 15/02; H04W 4/02
See application file for complete search history.

(56) References Cited

U.S. PATENT DOCUMENTS

2008/0195257 A1  8/2008  Rauch

FOREIGN PATENT DOCUMENTS

| CN | 1774381 A | 5/2006 |
| CN | 102482050 A | 5/2012 |
| EP | 1764334 A1 | 3/2007 |
| GB | 2416645 A | 2/2006 |
| WO | WO-2010/139846 A1 | 12/2010 |
| WO | WO-2011/012768 A1 | 2/2011 |
| WO | WO-2012/022827 A1 | 2/2012 |

(Continued)

OTHER PUBLICATIONS

International Search Report PCT/ISA/210 for International Application No. PCT/FI2013/050475 dated Dec. 27, 2013.

(Continued)

*Primary Examiner* — Kyoung Lee
(74) *Attorney, Agent, or Firm* — Harness, Dickey & Pierce, P.L.C.

(57) ABSTRACT

A mechanism for generating information about passenger flows. Mobile devices of passengers are used for providing information about other devices in the vicinity. The location of the device providing information detects other devices in the vicinity and transmits the information to a central system. Then, the central system associates this information with a location of a person when this person is identified by using an identification device attached to a gate, elevator or other transportation device. When the location of the person identified is known, the location persons having mobile devices in the vicinity can be estimated. Based on this continuously collected information passenger flows can be estimated and based on passenger flows control information for controlling transportation devices can be formed.

19 Claims, 3 Drawing Sheets

(56) References Cited

FOREIGN PATENT DOCUMENTS

WO    WO-2012/089920 A1    7/2012

OTHER PUBLICATIONS

Written Opinion of the international Searching Authority PCT/ISA/237 for International Application No. PCT/FI2013/050475 dated Dec. 27, 2013.
Extended European Search Report dated Dec. 15, 2016 for corresponding EP Application No. 13883072.4.
Chinese Office Action dated Jun. 27, 2016 for CN Application No. 201380075766.X.

MECHANISM FOR PASSENGER FLOW MANAGEMENT

This application is a continuation of PCT International Application No. PCT/FI2013/050475 which has an International filing date of Apr. 26, 2013, the entire contents of which are incorporated herein by reference.

FIELD OF THE INVENTION

The invention relates to passenger flow management and more particularly, to a mechanism for providing control information for transportation devices based on passenger flows.

BACKGROUND OF THE INVENTION

Public places have a plurality of transportation devices, such as elevators, escalators and similar. Depending on the application they may be programmed to take passenger flows into account. In the simple mechanism this is based, for example, to known high traffic hours. For example, there is a group of escalators comprising three separate escalators. When the direction of traffic is known, the group can be configured such that two escalators operate into the busier direction. Correspondingly, it is known that elevators may be brought to floors where the traffic is expected.

In the present application the expression passenger flow refers to flows caused by people when they are moving from original location to the desired location. These flows are constructed from movements of groups or individual persons. The actual number of persons in passenger flows varies depending on the application, however, the larger the number is the more beneficial it is to control transportation devices according to passenger flows.

In the present application the expression transportation device refers to any public transportation device. Examples of transportation devices are escalator, elevator, train, bus, taxi, tram or similar.

The problem of the traditional implementations is that the traffic hours are only estimates and might be incorrect. This problem has been addressed by collecting more information. For example, when a person entering an office building goes through a gate, it is common that he has to identify on that gate. For example, only employees are accepted through automatic gates and the guests are guided to the reception. When larger masses have a personal identification badge their location can be determined during the day. The problem of this approach is that these gates are typically only in the lobby or other entrances. In order to provide more accurate information regarding the flow more identification points may be introduced. For example, every lock in the building may include identification point. In addition to natural identification points it is possible to implement additional points, such as Bluetooth or wireless local area network (WLAN) base stations that register devices of the users and then provide the information further. Accurate information is achieved when the network of identification points is extensive. Optionally an indoor positioning system may be used. Using indoor positioning system devices are aware of the exact location and are able to provide the information for external systems.

Similar problems occur when public events, for example concerts or sport events, are arranged. Public transportation operator may be willing to provide additional trains or busses for serving the crowd but they do not have the exact information when the event is over. Furthermore, some people are wishing to avoid crowds and start leaving early. In case of big events already these early leaving guests may cause overcrowding in public transportations that could be avoided with better knowledge of passenger flows.

The problem of the solution disclosed above is the price of additional identification points, such as Bluetooth base stations. As the range of such base station is small a very large number of base stations may be needed. In addition to the initial investment they need continuous maintenance. Without these investments there is not enough data of passenger flows and transportation devices cannot be controlled by using passenger flow information. Thus, there is a need for obtaining passenger flow data by using more economical means.

SUMMARY

The invention discloses a mechanism for generating information about passenger flows. Mobile devices of passengers are used for providing information about other devices in the vicinity. The location of the device providing information detects other devices in the vicinity and transmits the information to a central system. Then, the central system associates this information with a location of a person when this person is identified by using an identification device attached to a gate, elevator or other transportation device. When the location of the person identified is known, the location persons having mobile devices in the vicinity can be estimated. Based on this continuously collected information passenger flows can be estimated and based on passenger flows control information for controlling transportation devices can be formed.

In an embodiment of the invention a method for providing control information for controlling transportation devices is disclosed. In the method first location information of at least one passenger having a mobile device is received from a first system, such as electric gate, electric lock, or similar. Then vicinity information comprising information of the mobile devices in the vicinity of said mobile device of said passenger is received from a mobile device of at least one passenger. This may be done simultaneously with the above mentioned receiving step. When both of these are received, the received location information is associated with the received vicinity information. Based on this control information for at least one transportation device can be provided.

In an embodiment of the invention the above described method is implemented as a computer program, which when executed a computing device, is configured to cause the steps of the method.

In an embodiment of the invention an apparatus comprising a data communication connection for receiving and sending data, a memory for storing said received data and computer programs and a processor for processing said received data is disclosed. The apparatus is configured to receive location information of at least one passenger having a mobile device from a first system, receive from said at least one passenger vicinity information comprising information of the mobile devices in the vicinity of said mobile device of said passenger, associate said received location information with said received vicinity information and provide control information for at least one transportation device based on said received information.

In a further embodiment of the invention a transportation device arrangement having at least one transportation device, such as an elevator, escalator or similar, is controlled with a controller comprising an apparatus described above.

A benefit of the invention is that based on the passenger flow information transportation devices can be optimized such that they provide best possible capacity for every traffic condition. The changes of directions and schedules may be optimized based on actual passenger flows instead of forecasted flows. This will provide shorter travel time and reduce inconveniences caused by traffic.

A further benefit of the invention is that instead of optimizing the best possible capacity it is possible to determine a quality of service. Then the passenger flows may be used for determining the transportation devices needed to fulfill the determined quality of service. When the whole capacity is not needed some of the transportation devices may be disabled for energy saving.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
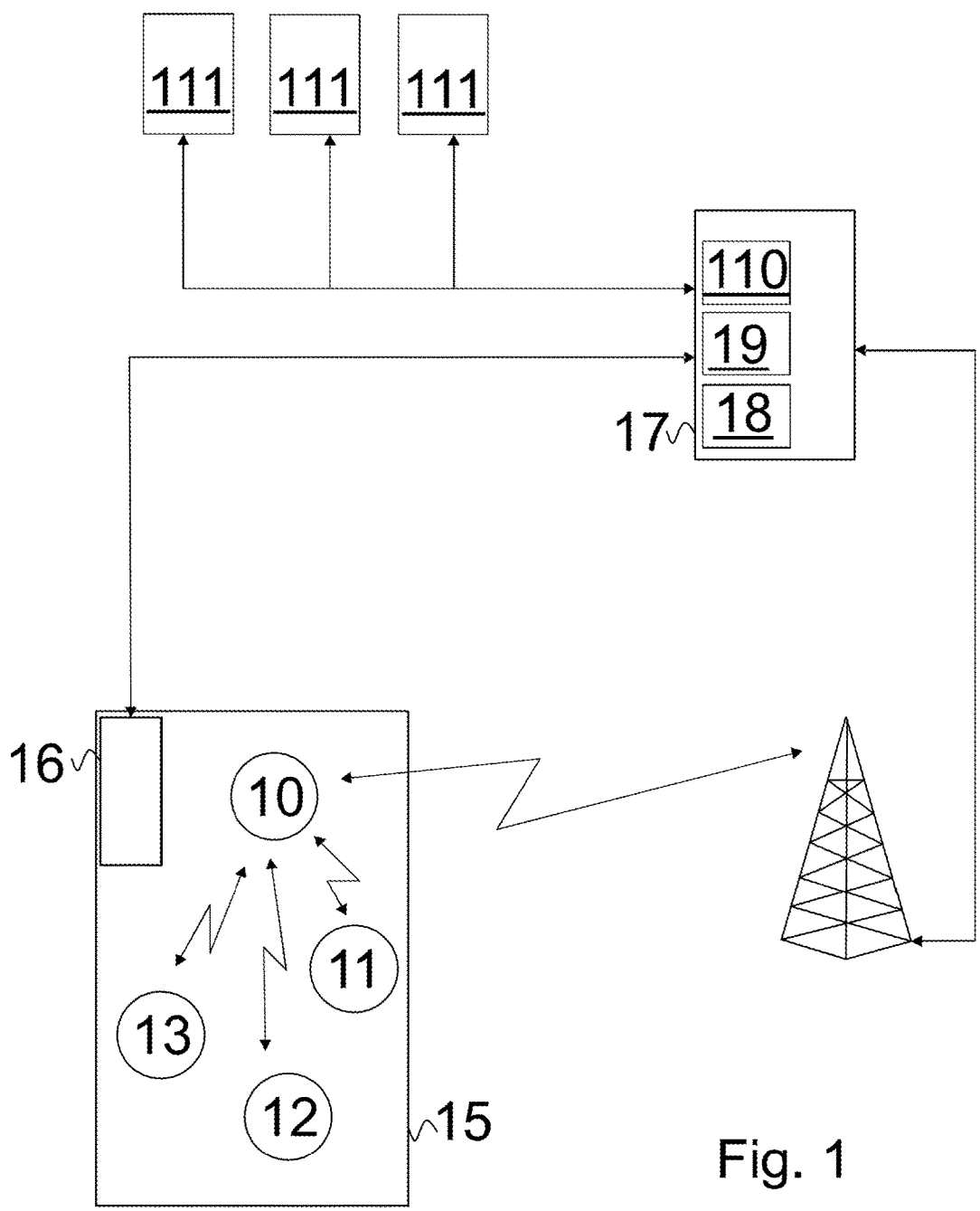
FIG. 1 is a block diagram of an example embodiment.

In FIG. 1 a block diagram of an example embodiment according to the present invention is disclosed. In FIG. 1 four persons 10-13 are located in an elevator car 14. It is assumed that each of the persons have a mobile device being capable of short distance communication. Typical example of such a short distance communication is a Bluetooth connection between devices, however, any other suitable communication method may be used. The elevator is controlled by a person 10 using an electronic key that allows the holder of the key to choose a destination floor according to the access rights. The key used may be a separate conventional electronic key or, for example a near field communication (NFC) functionality in a mobile device. The mobile device may be, for example, mobile phone, laptop computer or touch screen computer, such as Apple Ipad.

In the following first a conventional electronic key is assumed. It is commonly known that the key must have an identity for access rights. Furthermore, personal identification numbers (PIN) are often used together with these keys. Thus, when a person uses a key for choosing the floor the information will be sent to a system that is capable of checking access rights. The system for detecting access rights comprises a unit 16 at the elevator and a unit 17 in another location. Typically the elevator unit 16 is incorporated with the control panel of the elevator and unit 17 is typically central unit comprising functionality for access control system. In the illustration block 17 comprises a plurality of subsystems, such as an access control system, a system for controlling transportation devices, surveillance and a system capable of receiving and processing the information according to the present invention. These subsystems may be located at the same place as illustrated in the Figure and may be able to communicate with each other, however, it is not necessary for the present invention and the location of each system may be chosen according to the need. The present invention requires ability to receive the information from access control system and in some embodiments is able to send instructions to transportation device control system 110, however, transportation devices may also be controlled manually by a person based on the information received from a device according to the present invention. In the figure it is shown that the unit 17 may be further connected to other transportation devices 111 and they may be controlled accordingly.

When the person 10 choosing the floor identifies himself to the panel 16, the access control systems knows where he is located. Each key used in an access control system comprises a profile. According to the present invention this profile comprises an identifier that can be associated with a mobile device belonging to the person 10. The mobile device is configured to send information about other devices in the vicinity to the central system 18. This information is collected by using short distance communication network, such as Bluetooth, Wifi, or any other mechanism for detecting other mobile devices in the vicinity of the device. The device does not need to be able to communicate with other devices more than it is needed for counting the number of devices in the vicinity, however, also more information may be used. The mobile device 10 sends the counted number, or collected, to the central system 18. This sending may be done by using any network connectivity means available. For example, there may be wireless network available or the device may use the mobile network data connection. The data is then received at the central system 18. At the same time the access control system 19 is configured to provide the information about the key used to the central system 18. Thus, the central system has received independently two different data, wherein the first data includes the number of mobile devices in the vicinity of person 10 and the second data includes the location of person 10. Additional information, such as direction of movement, may be incorporated. Thus, the central system is able to determine the number of people in the elevator car. As the mobile device and access control system are fully independent sending of information must be triggered. For example, it is possible to use a timer or send information when there is detected a change in the number of devices in the vicinity.

If an NFC capable mobile device is used as a key instead of conventional electronic key, it is possible to send information always when the exact location of the device is known. Other triggers, such as the change of the number and timer as discussed above may also be used. Furthermore, it is possible to send the number of devices in the vicinity using the same means, such as NFC communication between the mobile device and the control panel 16. Thus, there is no need for using mobile communication network. Similar principle may be used if the mobile device is located by using, for example, WLAN or Bluetooth communication, wherein the exact location of the mobile device is known within the coverage range.

Other mobile devices belonging to other persons are sending similar information correspondingly, however, the exact location information is not known. In the example of FIG. 1 the mobile device of person 13 sends information. From the information it can be determined that the mobile device of the person 10 is in the vicinity. As the location of the mobile device of person 10 is known, the location of the mobile device of person 13 can be estimated. The estimated location can be used correspondingly. For example, if there was a third person, whose mobile device is able to communicate with a mobile device having estimated location, the location of the mobile device of the third person may be estimated. It should be noted that estimates based on other estimates are not as reliable as estimates based on the exact location, however, also inaccurate estimates may be used in determining the passenger flow. The known inaccuracy may be taken into account, for example, by giving smaller weight for inaccurate information when determining the passenger flow.

Figure 2:
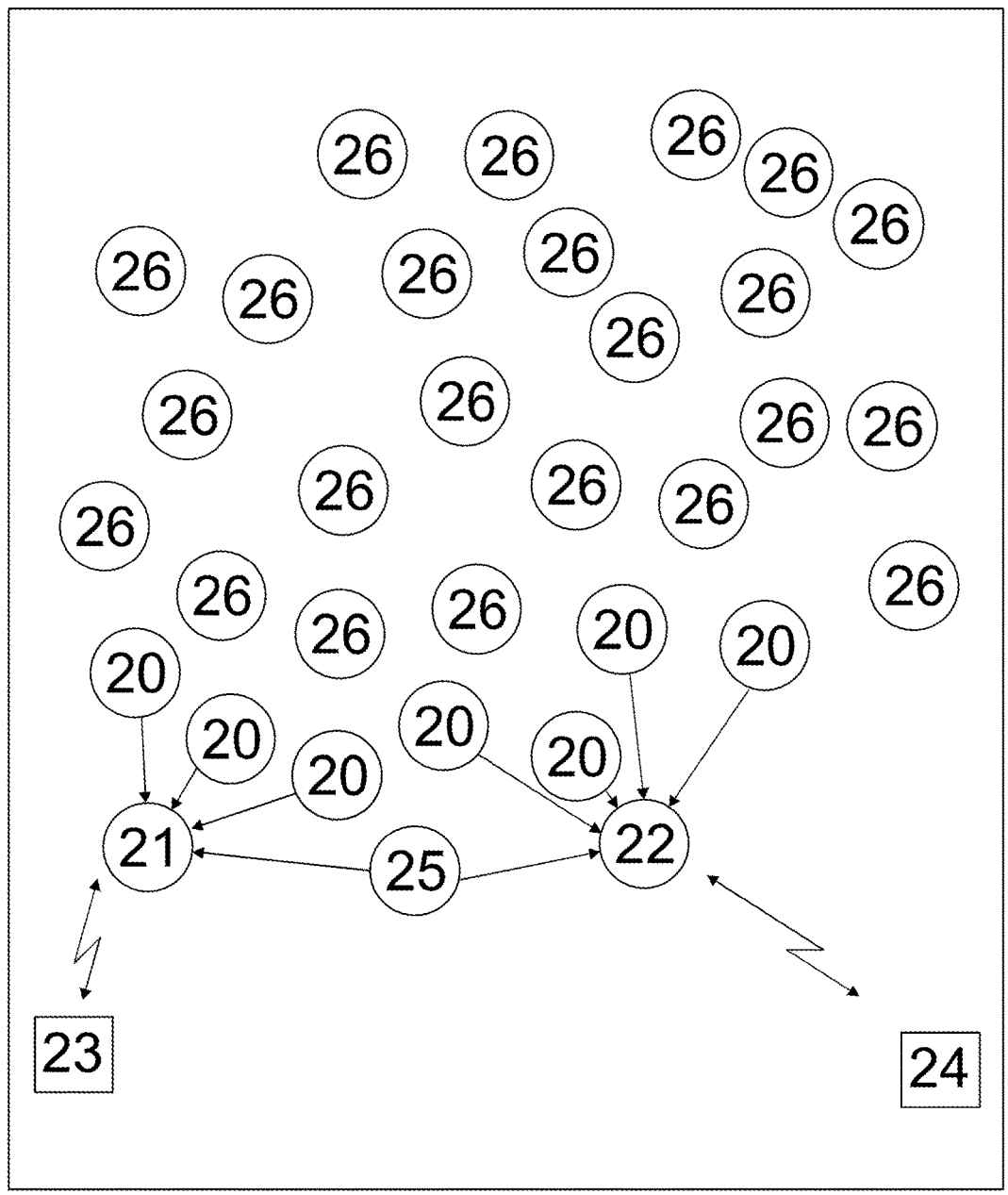
FIG. 2 is a block diagram of an example embodiment.

In FIG. 2 a second embodiment is disclosed. In the figure there is a plurality of people with a mobile device in a room. Persons 20 have a mobile device and their presence is noticed by mobile devices of persons 21 or 22. The mobile device of person 25 is noticed by devices of persons 21 and 22. Mobile devices belonging to persons 21 and 22 are the only ones that are close enough to the base stations 23 and 24. Base stations 23 and 24 are connected to a data communication network and they are capable of communicating with the central system. All devices 20-22, 25, 26 in the room exchange information about devices in their vicinity and receive respective information from the other devices. Then the information is sent through base stations 23 and 24 to the central system. Persons 26 act accordingly. Each of the devices having enable the functionality according to the present invention will send the information about other devices in the vicinity independently. Thus, information of each of the devices is typically sent many times.

In an example embodiment the information includes a unique identifier, an estimated location and estimated accuracy of the estimated location. The purpose of the unique identifier is to guarantee that each device is counted only once by devices sending the information to the central system. For example, in the example of FIG. 2 the mobile device of person 25 would be counted twice as the information is sent by mobile devices of persons 21 and 22, unless the central system can identify that it received the same information. In this embodiment each mobile device sends the information to the central system and the central system processes the information. The form of unique identifier varies on application basis. In an embodiment the unique identifier is an identifier that is associated to a personal identification of the user. When the system knows the identity of the person it may use the knowledge in generating further information. Furthermore, identifying the person solves conveniently the problem of having more than one device so that persons having more than one device are counted only once. For security reasons the association is typically stored at the central system so that the person cannot be identified from the unique identifier only. The association may be permanent or it may be dynamic so that the central system issues an identifier upon a request and the request is repeated according to the selected settings, for example, once a day or every time when the device is turned on. When the identity of the person is known, the central system may use other knowledge of the person for modeling. For example, the system may include the location of the work station, car park location or any other information that could be used in predicting the movement. In another embodiment, for security reasons, the personal identity associated identifier is not used as a unique identifier in messaging between devices. The device may choose a random identifier when the device or the application is started. It will use this identifier in communication between other devices. Based on the identifier the central system, or other devices, knows if the device has been already counted. If the personal identity is needed in the application, it may be exchanged between the central system and the device later, if the user of the device allows the exchange. Thus, other devices need not to have any identification information. The random identifier may be generated by the device itself or it may be requested from the central system. When the device generates the identifier by itself there is always a risk that the same identifier will be used twice. However, by choosing an identifier large enough, for example a 32 bit number, it is highly unlikely that the same identifier will be used in small crowds twice and in larger crowds the effect of using same identifier twice is diluted.

In an embodiment the location of the device is estimated. There are various ways of estimating the location. Furthermore, the estimate may be done by the device itself or by some other device, such as the central system. An example of determining the location is using already known locations. For example, if it is detected that a person uses a gate, elevator, door or other facility where the person needs to be identified, the location of the person is known. In some cases it is possible to determine the direction of the movement based on the received location. For example, in case of elevator the destination floor is known or the gate may be one-way gate. When the initial location has been determined, it maybe updated by estimating the speed and direction of the movement. The accuracy of the estimate then reduces as a function of time. The accuracy information may be maintained together with the estimate.

In the examples above the estimated location is based on the location of used identification device. Thus, the accuracy is very good. Sometimes the estimate is done by using information received from other mobile devices, or other systems, such as cell information of the mobile communication network, location of the used wireless LAN base station, Bluetooth base station or similar. In these cases the location of the base station is known and often the distance from the base station can be determined from the propagation delay. The accuracy may be estimated for each case by setting a static value, for example in meters, or it may be changed dynamically for each case. In a further example the device locates itself by using mobile positioning service, satellite based positioning system, such as GPS, or any other positioning system that may be able to provide the exact location in some locations if turned on.

Figure 3:
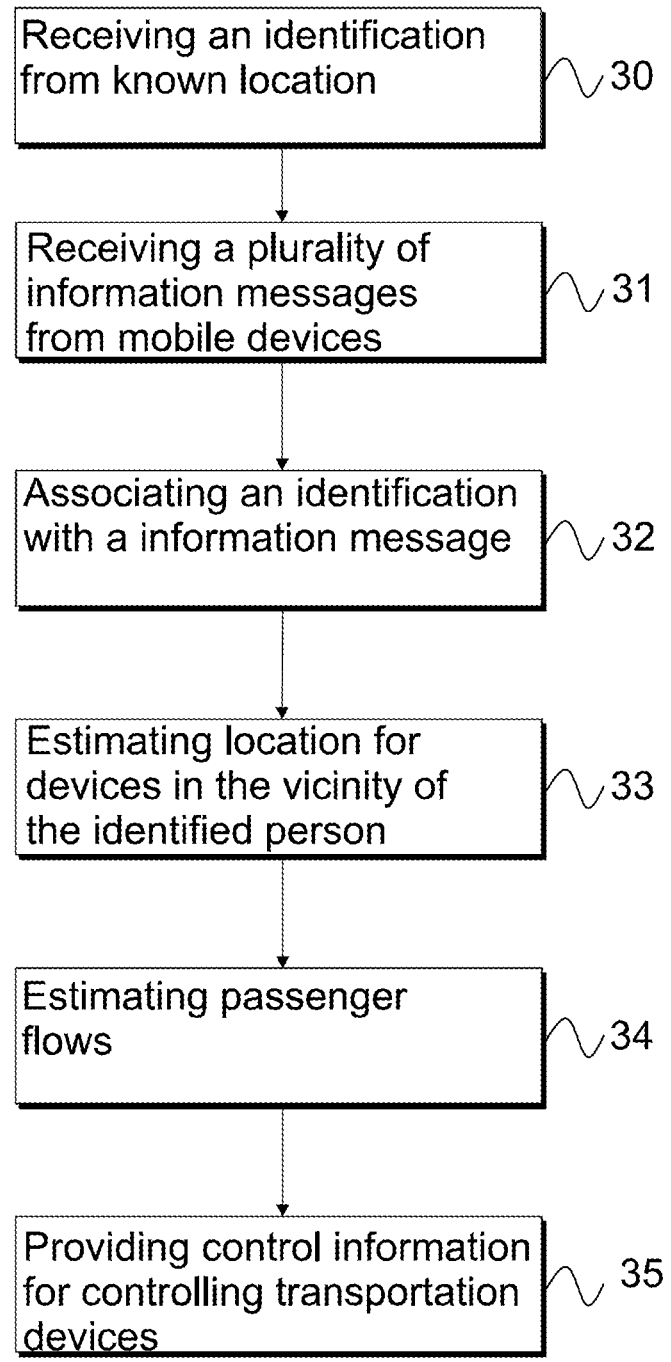
FIG. 3 is a flow chart of a method according to an example embodiment.

In FIG. 3 a method according an embodiment is disclosed. In the method an apparatus for providing control information to transportation devices, such as elevators, escalators, taxi services and similar is used. The apparatus is able to detect passenger flows and to provide information that is needed to transport the crowd efficiently. The information may be used for different sizes of crowd. For example, if a concert with a lot of audience has ended and the public transportation operator has prepared to provide extra trains, they will know when they need to start providing these extra trains as they might not be able to wait at the station. An example of smaller crowd is a business meeting involving only few participants. When they start to move together an elevator may be brought to them before they reach elevator lobby. A further example includes a large office building or shopping center having escalators, wherein the direction of the escalators can be changed based on the traffic information.

In the example of FIG. 3 the device is configured to receive an identification from a known location, step 30. The known location may be, for example, a gate, door, elevator or any other key controlled facility. The user identifies himself and the access control system detects if the user has permission to use it. At the same time the access control system knows exactly the location of the person using the key. This identification and location is then sent to central apparatus according to the present invention. The central apparatus receives this information.

At the same time the central apparatus receives messages from a plurality of mobile devices, step 31. These messages may include information about the device sending the message, such as unique identifier of the device, personal identification of the user, the number of devices detected in the vicinity, device identifiers of detected devices, estimated location of these devices, estimated accuracy of the estimated location, and similar.

Then the received messages are associated such that a location of the mobile device of the identified person is known, step 32. Based on this association the location of the mobile devices in the vicinity of the mobile device of the identified person can be estimated, step 33. This may include, for example, using information about the propagation delay between the devices. Based on the known locations it is possible to estimate passenger flows, step 34. In the estimation it is possible to use the known locations, earlier known locations, known direction of movement, such as destination floor in elevator, known speed of movement, such as speed of an escalator, and similar. When all information received from devices is combined, passenger flows can be determined.

Based on the determined passenger flows control information for controlling transportation devices can be provided, step 35. The operation of the transportation system can be then performed either automatically or manually.

The above mentioned method may be implemented as computer software which is executed in a controller of an elevator or a computing device able to instruct such controller. When the software is executed in a computing device it is configured to perform the above described inventive method in order to facilitate discovery resources in a mobile communication network. The software is embodied on a computer readable medium so that it can be provided to the computing device.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for providing control information to control transportation devices, the transportation devices being one or more of elevators and escalators, the method comprising:
    receiving location information of a first passenger having a first mobile communication device associated therewith;
    receiving, from the first mobile communication device, vicinity information of second mobile communication devices associated with second passengers in a vicinity of the first mobile communication device;
    associating the location information and the vicinity information;
    generating the control information to control at least one of the transportation devices based on an association between the location information and the vicinity information; and
    transmitting the control information to a controller associated with the one or more of the elevators and the escalators to control the transportation devices.

2. The method according to claim 1, wherein the method further comprises:
    transmitting a unique identifier in response to a request for same, the unique identifier uniquely identifying the first passenger.

3. The method according to claim 2, wherein the method further comprises:
    generating a random unique identifier; and
    transmitting the random unique identifier as the unique identifier.

4. The method according to claim 3, wherein the method further comprises:
    associating the random unique identifier with an identity of the second passengers.

5. The method according to claim 2, wherein the unique identifier is associated with an identity of the second passengers.

6. The method according to claim 1, wherein the method further comprises:
    receiving an identifier for each of the second mobile communication devices in the vicinity of the first mobile communication device.

7. The method according to claim 6, wherein said identifier is randomly generated.

8. The method according to claim 1, further comprising:
    estimating an estimated location of the second mobile communication devices based on the association between the location information and the vicinity information;
    estimate an estimated flow of movement of the second passengers based on the estimated location of the second mobile communication devices associated therewith; and
    generate the control information based on the estimated flow of movement.

9. A non-transitory computer readable medium comprising computer program code that, when executed on a data-processing system, configures the data-processing system to,
    receive location information of a first passenger having a first mobile communication device associated therewith,
    receive, from the first mobile communication device, vicinity information of second mobile communication devices associated with second passengers in a vicinity of the first mobile communication device,
    associate the location information and the vicinity information,
    generate control information to control at least one transportation device based on an association between the location information and the vicinity information, the at least one transportation device being one or more of an elevator and an escalator; and transmit the control information to a controller associated with the one or more of the elevator and the escalator to control the at least one transportation device.

10. The non-transitory computer readable medium according to claim 9, wherein the data-processing system is further configured to,
   estimate an estimated location of the second mobile communication devices based on the association between the location information and the vicinity information
   estimate an estimated flow of movement of the second passengers based on the estimated location of the second mobile communication devices associated therewith, and
   generate the control information based on the estimated flow of movement.

11. An apparatus comprising:
   a communication device configured to transmit and receive data;
   a memory configured to store the data; and
   a processor configured to,
      receive location information of a first passenger having a first mobile communication device associated therewith,
      receive, from the first mobile communication device, vicinity information of second mobile communication devices associated with second passengers in a vicinity of the first mobile communication device;
      associate the location information and the vicinity information;
      generate control information to control at least one transportation device based on an association between the location information and the vicinity information, the at least one transportation device being one or more of an elevator and an escalator; and
      transmit the control information to a controller associated with the one or more of the elevator and the escalator to control the at least one transportation device.

12. The apparatus according to claim 11, wherein the apparatus is further configured to transmit a unique identifier in response to a request for same, the unique identifier uniquely identifying the first passenger.

13. The apparatus according to claim 12, wherein the apparatus is further configured to:
   generate a random unique identifier; and
   transmit the random unique identifier as the unique identifier.

14. The apparatus according to claim 13, wherein the apparatus is further configured to:
   associate the random unique identifier with an identity of the second passengers.

15. The apparatus according to claim 12, wherein the unique identifier is associated with an identity of the second passengers.

16. The apparatus according to claim 11, wherein the apparatus is further configured to:
   receive an identifier for each of the second mobile communication devices in the vicinity of the first mobile communication device.

17. The apparatus according to claim 16, wherein said identifier is randomly generated.

18. A transportation device comprising:
   an elevator controller configured to transmit and receive the data from the apparatus of claim 11.

19. The apparatus according to claim 11, wherein the processor is further configured to,
   estimate an estimated location of the second mobile communication devices based on the association between the location information and the vicinity information,
   estimate an estimated flow of movement of the second passengers based on the estimated location of the second mobile communication devices associated therewith, and
   generate the control information based on the estimated flow of movement.

* * * * *